United States Patent [19]

Occhiello et al.

[11] Patent Number: 5,882,751
[45] Date of Patent: Mar. 16, 1999

[54] PARISON FOR THE PREPARATION OF RE-USABLE BOTTLES STARTING FROM MODIFIED PET

[75] Inventors: Ernesto Occhiello, Novara; Riccardo Po', Leghorn, both of Italy

[73] Assignees: Enichem SpA, Milan; INCA International SpA, Matera, both of Italy

[21] Appl. No.: 718,870

[22] Filed: Sep. 24, 1996

Related U.S. Application Data

[62] Division of Ser. No. 444,368, May 18, 1995, Pat. No. 5,601,780.

[30] Foreign Application Priority Data

May 27, 1994 [IT] Italy ............................... 00187 MI94A

[51] Int. Cl.$^6$ ..................................................... B29B 7/00
[52] U.S. Cl. ................... 428/35.7; 428/36.9; 428/36.92; 428/480; 428/542.8
[58] Field of Search ................................. 428/35.7, 36.9, 428/36.92, 480, 542.8

[56] References Cited

U.S. PATENT DOCUMENTS

| | | | |
|---|---|---|---|
| 4,994,313 | 2/1991 | Shimizu et al. | 428/36.7 |
| 5,028,462 | 7/1991 | Matlack et al. | 428/35.7 |
| 5,030,705 | 7/1991 | Hirahara et al. | 528/176 |
| 5,213,856 | 5/1993 | Po' et al. | 428/34.1 |
| 5,239,045 | 8/1993 | Hirahara et al. | 528/272 |
| 5,278,281 | 1/1994 | Po' et al. | |
| 5,302,686 | 4/1994 | Tanaka et al. | 428/35.7 |
| 5,334,343 | 8/1994 | Po' et al. | |
| 5,523,135 | 6/1996 | Shiwaku et al. | 428/35.7 |

FOREIGN PATENT DOCUMENTS 95200091  1/1995  European Pat. Off. .

*Primary Examiner*—H. Thi Le
*Attorney, Agent, or Firm*—Oblon, Spivak, McClelland, Maier & Neustadt, P.C.

[57] ABSTRACT

A parison for transparent re-usable bottles, obtained by molding by injection-blow moulding cycle copolymers containing units deriving from terephthalic acid and ethylene glycol characterized in that said copolymers contain from 0.1 to 10% in moles of units deriving from aromatic diacids different from terephthalic acid and from 0.1–15% in moles of units deriving from aromatic hydroxyacids, making reference to the units deriving from terephthalic acid.

15 Claims, No Drawings

PARISON FOR THE PREPARATION OF RE-USABLE BOTTLES STARTING FROM MODIFIED PET

This is a division, of application Ser. No. 087/444.368 filed on MAY 18. 1995, now U.S. Pat. No. 601,780.

The present invention relates to a process for the preparation of transparent and re-usable bottles, obtained from copolymers based on modified aromatic polyesters.

More specifically, the present invention relates to a process for the preparation, by an injection-blow moulding cycle, of re-usable transparent bottles suitable for fizzy drinks and obtained from copolymers based on polyethylene terephthalate, modified with aromatic diacids different from terephthalic acid and aromatic hydroxyacids.

In addition, the invention relates to bottles obtained by the above process and the parisons suitable for molding to produce these bottles.

The use of bottles in re-usable thermoplastic material for fizzy drinks has become widespread in the last few years especially in countries where monetary deposits have been imposed on consumers for plastic liquid containers.

The characteristics required of these bottles are specified in European patent 465040.

According to this patent, the fundamental requisite is that the bottle must be re-usable for at least 20 times.

Each utilization cycle requires, above all, washing for about 20 minutes at temperatures of about 60° C. in sodium hydroxide alkaline solutions. This is followed by the filling, also with liquids similar to the original, in the normal automatic lines and distribution.

With respect to the end-product, the normal requisites imposed by the fizzy-drink industry are valid, these comprising: mechanical resistance to compression, barrier properties with respect to carbon dioxide, reduced content of aldehydes, in particular acetaldehyde, geometrical and dimensional requisites, etc.

The present industrial standard requires, for bottles having a capacity of 1.5 litres, a weight of about 100–110 g (against an average of 40–50 g for non-reusable bottles).

Re-usable PET bottles are produced with injection-low molding technology, a description of which can be found in Christopher Irwin's article published in "Encyclopedia of Polymer Science and Technology" Vol. 2, page 447, published by Wiley, New York, 1985.

The first step of this technology consists in the production of parisons, basically tubular, by injection molding.

In the case of re-usable bottles these parisons have a thickness of about 6–7 mm (against about 3 mm for conventional non-reusable bottles) and this can cause serious drawbacks if the material used for their production does not respond to certain characteristics.

The greater thickness of the parison makes the cooling of the mold, maintained typically at a temperature of 6°–10° C., less effective.

In addition, during the blowing step, a greater time is required for a correct filling of the cavity. Infact, the production cycles of parisons for re-usable bottles are at present about 45 seconds, against 17–23 seconds for parisons for conventional bottles.

When PET is used, which has a moderate tendency to crystallization from the molten state, with a maximum rate of this process at temperatures of about 160°–170° C., both the above factors cause a permanence of the material in the area of the maximum crystallization ate from the molten state for much greater times than hose relating to parisons for non-reusable bottles. here is consequently a high probability that opaque parisons are obtained owing to the formation of crystals with dimensions which are sufficient to significantly alter the light diffusion.

In order to overcome this drawback, modifications have been made to PET.

For example, good results have been obtained, by modifying PET at a macromolecular level, with cyclohexanedimethanol. The PET thus obtained has an extremely slow crystallization kinetics and generally enables transparent re-usable bottles to be obtained. The comonomer used however is not easily available.

Other problems could be caused by the processability characteristics of the material, in particular during the injection phase.

Materials with a good processability enable the end-product to be obtained within a sufficiently wide range of process conditions (temperature, number of extruder revolutions, temperature of the cooling water, cycle time, pressures, etc.) to make the material adaptable to different kinds of transformation machines, which are at different levels of maintenance and reliability.

Also in the blowing phase, which takes place in the second step of the process, it is important to use materials with a good processability.

This step, as indicated in the C. Irwin's article cited above, mainly consists in the preliminary heating of the parisons to temperatures of about 100°–110° C., in the case of PET. The parison is subsequently subjected firstly to mechanical stress, by means of a bar which pushes the material towards the bottom of the mold, and then pneumatic stress, by insufflation of air which pushes the material towards the walls of the mold.

Alternatively, the formation of the bottle is simply carried out by blowing, without the help of the drawbar.

The processability of the material, in the blow cycle, facilitates its distribution and permits the desired thicknesses to be obtained, in addition, it provides a certain flexibility in handling the various process parameters (temperature of the parison, strength of the drawbar, pressures and blow rate).

In the European patent No. 465.040 mentioned above of Kerr et al., the importance is given of having, for the blow cycle, copolymers based on ethylene terephthalate, containing from 1 to 6% in moles of an aromatic diacid and optionally a level of diethylene glycol of more than 1%.

The function of the diacid is to modify the orientation and crystallization kinetics and consequently to improve the processability.

All attempts however to prepare parisons and bottles starting from copolymers of the type claimed in European patent 465.040 have always led to the production of opaline articles, clearly showing the formation of crystallites.

The Applicant has now surprisingly found that the use of particular copolymers based on polyethylene terephthalate modified by aromatic diacids which are different from terephthalic acid and aromatic hydroxyacids, for the preparation of re-usable bottles, enables the above crystallization phenomena to be avoided and produces perfectly transparent parisons and bottles.

In addition the polymers based on PET thus modified have proved to have a better processability both in the injection and blow phases.

A first aspect of the present invention therefore relates to a process for the preparation of re-usable transparent bottles, which consists in moulding by an injection-blow moulding cycle copolymers containing units deriving from terephthalic acid and ethylene glycol characterized in that these copolymers contain from 0.1 to 10% in moles of units deriving from aromatic diacids different from terephthalic acid and from 0.1 to 15% in moles of units deriving from aromatic hydroxyacids, making reference to the units deriving from the terephthalic acid.

A second object of the invention relates to the parisons obtained by this process.

A third object of the invention relates to re-usable bottles obtained by this process.

Copolymers based on polyethylene terephthalate comprising quantities of aromatic diacids different from terephthalic acid and aromatic hydroxyacids are known in literature (S. Morimoto, "Man-Made Fibers—Science and Technology" H. F. Mark, S. M. Atlas, E. Cernia eds., Interscience Publ., New York, 1988, vol. 3, page 21).

Their application however in the field of the production of hollow containers is new, as their surprising adaptability to the production of re-usable bottles and relative parisons has never been revealed.

The process of the present invention permits the production of perfectly transparent parisons and it is known that this is definitely the most critical passage in the preparation of bottles.

The modifications brought to the copolymers based on PET of the present invention, which comprise aromatic diacids different from terephthalic acid and aromatic hydroxyacids, does not influence, however, their crystallization rate which remains similar to that claimed in European patent 465.040.

The copolymers of the present invention can also comprise diethylene glycol in a quantity of less than 5% in moles with respect to the total glycols and preferably less than 3%.

The copolymer used for the preparation of the transparent bottles according to the process of the invention has a chemical structure mainly consisting of a succession of terephthaloyl and 1,2-dioxyethylene units.

A quantity of between 0.1 and 10% in moles of the structural terephthaloyl units can be substituted with aromatic bicarboxylic acids such as isophthalic acid, 2,6-naphthalenedicarboxylic acid, 4,4'-biphenyldicarboxylic acid, 4,4'-oxydibenzoic acid, etc.

A quantity of up to a maximum of 5% in moles, preferably 3%, of 1,2-dioxyethylene units, due to ethylene glycol, can be substituted by diethyleneglycol units.

In addition, a quantity of between 0.1 and 15% in moles of structural terephthaloyl units can be substituted by aromatic hydroxyacids, such as p-hydroxybenzoic acid, salicylic acid, 6-hydroxy-2-naphthoic acid, etc.

The copolymer based on PET modified according to the process of the present invention can be produced starting from either the appropriate diacids, diols and hydroxyacids by means of direct polyesterification processes, or from diesters of the appropriate diacids, diols and hydroxyesters by means of polytransesterification processes, as known in industrial practice.

The term re-usable, transparent bottles for fizzy drinks, as used in the present description and claims, refers to bottles which are at present on the market and described in European patent 465.040.

Examples of these bottles are those characterized by a capacity of 1.5 litres and a weight of about 100–110 g or a capacity of 1 liter and a weight of about 80–90 g.

According to the present invention the molding process of the thermoplastic mixture of modified PET comprises an injection-blow cycle.

This cycle can be carried out in two steps, the first involves the formation of a parison, basically tubular having a thickness greater than 4.5 mm, generally between 5 and 9 mm, and a weight of more than 80 g, generally between 80 and 130 g, the second step involves the blowing of the parison thus obtained, maintained at a temperature of between 100° and 120° C., possibly combined with a mechanical stretching in accordance with what is described in "Encyclopedia of Polymer Science and Technology" Vol 2, page 447, published by Wiley, New York, 1985 or in European patent EP 465.040.

Both steps can be carried out in a single apparatus or in separate transformation machines.

The polymerization in the molten state generally gives molecular weight values corresponding to viscosity in solution (see regulation ASTM D 4603-86) of about 0.6 dl/g.

The molecular weight will therefore be increased by polymerization in the solid state, as is the case in industrial practice, and brought to such values as to give a viscosity in solution, according to the above regulation, of between 0.7 and 1.5 dl/g, preferably between 0.75 and 1.0 dl/g.

The process of the present invention does not require modifications of the extrusion and injection moulding conditions which can be adapted according to the transformation machines available.

In addition, important modifications are in any case not required for the conventional cycle (eg. cooling to temperatures lower than the standard ones).

Similarly, no modification is required even in the blowing phase, in addition to the common procedure selected for the combination of parameters, suitable for producing the best distribution of the material, and typical of every combination material-transformation apparatus.

The following examples are purely illustrative and in no way limit the scope of the present invention which is specified in the enclosed claims.

EXAMPLE 1

The following polymerization process in the molten state and solid state was repeated three times.

A polymerization reactor with a capacity of about 40 l was placed in a nitrogen atmosphere and charged with 17.654 kg (91 moles) of dimethyl terephthalate, 0.582 kg (3 moles) of dimethyl isophthalate, 0.912 kg (6.0 moles) of methyl 4-hydroxybenzoate, 0.2 kg (1.9 moles) of diethyleneglycol and 13.64 kg (220.0 moles) of ethylene glycol. The reaction mixture was brought to 130° C. and the catalytic solution consisting of 3.06 g of magnesium acetate heptahydrate, 0.70 g of manganese acetate tetrahydrate, 1.25 g of zinc acetate dihydrate, 2.84 g of cobalt acetate tetrahydrate, 1.64 g of sodium benzoate in 100 ml of ethylene glycol, was added, after which the temperature of the reaction mass was brought to 160°–170° C.; at this temperature the methanol began to distill. When the distillation of the methanol was completed and about 400 g of ethylene glycol had been removed, a solution of 4.97 g of phosphoric acid in 100 ml of ethylene glycol and a solution of 8.67 g of antimony trioxide in 600 g of ethylene glycol were added to the reaction mixture, at a temperature of 220° C. While the pressure was gradually brought to 0.8 torrs and the temperature to 285° C., the excess ethylene glycol was distilled and the reaction mass slowly became more and more viscous. After about 3 hours and 30 minutes of reaction under a high vacuum at 285° C., the polymer was extruded and granulated.

The polymer was then regraded to the solid state in a polymerization reactor with a capacity of about 50 l for 25 hours at about 0.1 torr of pressure and with a temperature of the oil in the heating jacket of the reactor of 240° C. Determinations of the semi-crystallization times were then carried out, using DSC measurements (Perkin Elmer DSC-7 instrument), according to the following procedure:

the sample was heated to 280° C. and maintained in the molten state for 2 minutes, to destroy every crystalline center;

the temperature was rapidly decreased (150° C./minute) to that of interest;

maintaining the temperature constant, the behavior of the thermal exchange was recorded in relation to the time;

the semi-crystallization time was considered to be that required to reach an area equal to half of the typical area of the crystallization exothermic peak.

Table 1 shows the average value on the batches produced of the semi-crystallization time and viscosity in solution, as defined above.

EXAMPLE 2

The following polymerization procedure in the molten state and solid state was repeated twice.

A polymerization reactor with a capacity of about 40 l was placed in a nitrogen atmosphere and charged with 16.151 kg (83.25 moles) of dimethyl terephthalate, 0.436 kg (2.25 moles) of dimethyl isophthalate, 0.684 kg (4.50 moles) of methyl 4-hydroxybenzoate, 11.880 kg (192 moles) of ethylene glycol. The reaction mixture was brought to 130° C. and the catalytic solution consisting of 4.74 g of manganese acetate tetrahydrate in 100 ml of ethylene glycol, was added, after which the temperature of the reaction mass was brought to 150° C.; at this temperature the methanol began to distill. When the distillation of the methanol was completed and about 400 g of ethylene glycol had been removed, a solution of 4.86 g of triphenyl phosphate in 200 ml of ethylene glycol and a solution of 3.65 g of antimonium trioxide in 200 g of ethylene glycol were added to the reaction mixture, at a temperature of 220° C. While the pressure was gradually brought to 0.8 torrs and the temperature to 285° C., the excess ethylene glycol was distilled and the reaction mass slowly became more and more viscous. After about 3 hours and 20 minutes of reaction under a high vacuum at 285° C., the polymer was extruded and pelletized.

The polymer, after the two batches obtained from the polymerization in the molten state had been mixed, was then regraded to the solid state in a polymerization reactor with a capacity of about 50 l for 25 hours at about 0.2 torrs of pressure and with a temperature of the oil in the heating jacket of the reactor of 240° C.

Table 1 shows the half-crystallization time value.

COMPARATIVE EXAMPLE 1

Commercial PET 9921, produced by Eastman Kodak and commonly used for the production of re-usable bottles and relative parisons, was subjected to half-crystallization time measurement at 160° C., following a similar procedure to that described above and obtaining the result shown in Table 1.

COMPARATIVE EXAMPLE 2

A copolyester of the type claimed in the previously mentioned patent of K. M. Jones and G. P. Kerr with the procedure described below repeated three times.

A polymerization reactor with a capacity of about 40 l was placed in a nitrogen atmosphere and charged with 18.43 kg (95 moles) of dimethyl terephthalate, 1.22 kg (5 moles) of dimethyl naphthalene-2,6-dicarboxylate, 0.2 kg of diethyleneglycol and 13.64 kg (220 moles) of ethylene glycol. The reaction mixture was brought to 140° C. and the catalytic solution consisting of 3.06 g of magnesium acetate heptahydrate, 0.70 g of manganese acetate tetrahydrate, 1.25 g of zinc acetate dihydrate, 2.84 g of cobalt acetate tetrahydrate, 1.64 g of sodium benzoate in 100 ml of ethylene glycol, was added, after which the temperature of the reaction mass was brought to 180° C.; at this temperature the methanol began to distill. When the distillation of the methanol was completed (about 6 kg) and about 200 g of ethylene glycol had been removed, a solution of 4.97 g of phosphoric acid in 100 ml of ethylene glycol and a solution of 8.67 g of antimonium trioxide in 600 g of ethylene glycol were added to the reaction mixture, at a temperature of 230° C. While the pressure was gradually brought to 0.9 torrs and the temperature to 280° C., the excess ethylene glycol was distilled and the reaction mass slowly became more and more viscous. After about 2 hours and 40 minutes of reaction under a high vacuum at 280° C., when the pressure in the oilpneumatic circuit which controlled the stirrer was 32 bars at 100 revs per minute, the polymer was extruded and pelletized.

The polymer was then regraded to the solid state in a polymerization reactor with a capacity of about 50 l for 25 hours at about 0.1 torr of pressure and with a temperature of the oil in the heating jacket of the reactor of 240° C.

The average half-crystallization time and viscosity values are shown in Table 1.

COMPARATIVE EXAMPLE 3

The production of parisons, intermediate passage towards the production of bottles, was carried out using an injection press produced by B&B, Brescia, operating with a single cavity mold.

The reference material 9921, of Eastman Kodak, commonly used for this type of process was mainly used. Before the molding, the material has been dried at 180° C. for 5 hours, using a Piovan drier situated directly in the feeding chute. The temperature of the extruder zones was regulated at 250° C. and the cycle time was about 60 s, the mold was cooled with water at 7° C.

The 9921 (Comp.ex.1) had a much greater half-crystallization time than the other materials indicated in Table 1. Parisons with excellent transparency were obtained.

COMPARATIVE EXAMPLE 4

The parison injection experiment was repeated using the experimental copolyester of comparative example 2, which had a half-crystallization time at 160° C. higher than that of the materials of the invention. The same equipment and drying cycle were used as in comparative example 3, but the temperature was regulated at 255° C., the cycle time at 65 s and the temperature of the water at 7° C.

The relative parisons proved to be much more opaque than those of comparative example 3, showing a problem of a too rapid crystallization.

EXAMPLE 3

The copolymer of example 1 was molded with apparatus and drying cycle identical to those described. It was possible to obtain perfectly transparent parisons with a lower preset temperature (245° C.) and cycle times (about 60 s) comparable to comparative example 3. This result is extremely surprising, as the half-crystallization time is dramatically lower than that of the 9921 and even than the copolyester of comparative example 2, which however produces opaline parisons (comparative example 4).

COMPARATIVE EXAMPLE 5

The parisons produced in comparative example 3 were subjected to a blowing cycle using a single mold apparatus produced by Krupp, but modified by Tooling Preform systems. The apparatus consists in a heating oven of the parison, with infrared lamps, and a blowing unit in which the hot parison is previously subjected to stress with a drawbar and then to pre-blowing and blowing.

The parisons of comparative example 3 were heated to 100° C. and then subjected to stretching-blowing. A good facility was observed of distributing the material and obtaining a perfectly transparent bottle.

COMPARATIVE EXAMPLE 6

The parisons of comparative example 4 were heated to 100° C. and then subjected to stretching-blowing. Also in this case the distribution of the material was good, but a much more opaque bottle was obtained with respect to the case of comparative example 5.

EXAMPLE 4

The parisons of example 3 were heated to 100° C. and then subjected to stretching-blowing. The facility of distribution was excellent and a bottle was obtained with characteristics which were absolutely comparable to those of the bottle obtained starting from a material of the type specified in the patent of K. M. Jones and G. P. Kerr.

TABLE 1

Values of half-crystallization time at 160° C. and viscosity in solution for the copolyesters described.

| Example | $t_{1/2}$ (min.) | Visc. solut. (dl/g) |
|---|---|---|
| 1 | 3.5 | 0.77 |
| 2 | 1.5 | n.d. |
| comp. 1 | 18.0 | 0.86 |
| comp. 2 | 5.5 | 0.81 |

We claim:

1. A parison for transparent re-usable bottles of the tubular type having a thickness greater than 4.5 mm and a weight of more than 80 g obtained by the process which consists in molding by an injection-blowing cycle copolymers containing units deriving from terephthalic acid and ethylene glycol characterized in that said copolymers contain from 0.1 to 10% in moles of units deriving from aromatic diacids different from terephthalic acid and from 0.1–15% in moles of units deriving from aromatic hydroxyacids, referring to the units deriving from terephthalic acid.

2. A parison according to claim 1 wherein the units deriving from aromatic diacids different from terephthalic acid are between 0.1–5% in moles.

3. A parison according to claim 1 wherein the units deriving from aromatic hydroxyacids are between 0.1–5% in moles.

4. A parison according to claim 1, wherein the aromatic diacids different from terephthalic acid are selected from isophthalic acid or 2,6-naphthalenedicarboxylic acid, 4,4'-biphenyldicarboxylic acid or 4,4'-oxydibenzoic acid.

5. Process according to claim 1 wherein the aromatic hydroxyacids are selected from p-hydroxybenzoic acid, salicylic acid or 6-hydroxy-2-naphthoic acid.

6. A parison according to claim 1 wherein the copolymer contains from 0.1 to 5% in moles of 1,2-dioxyethylene units referring to the units deriving from ethylene glycol.

7. A parison according to claim 1 wherein the 1,2-dioxyethylene units referring to the units deriving from ethylene glycol are between 0.1–3% in moles.

8. A parison according to claim 1 having a thickness of between 5 and 9 mm and a weight of between 80 and 130 g.

9. A parison for transparent re-usable bottles of the tubular type having a thickness greater than 4.5 mm and a weight of more than 80 g obtained by the process comprising injection blow molding a copolymer consisting essentially of the polyesterification product of terephthalic acid, ethylene glycol, 0.1 to 10 mol%, based on terephthalic acid, of an aromatic diacid different from terephthalic acid selected from the group consisting of isophthalic acid, 2,6-naphthalenedicarboxylic acid, 4,4'-biphenyldicarboxylic acid and 4,4'-oxydibenzoic acid, and from 0.1–15 mol %, based on terephthalic acid, of an aromatic hydroxyacid.

10. A parison according to claim 9, wherein the amount of aromatic diacid different from terephthalic acid is between 0.1 to 5 mol %, based on terephthalic acid.

11. A parison according to claim 9 wherein the amount of aromatic hydroxyacid is between 0.1 to 5 mol %, based on terephthalic acid.

12. A parison according to claim 9, wherein the aromatic diacids different from terephthalic acid are selected from the group consisting of isophthalic acid, 2,6-naphthalenedicarboxylic acid, 4,4'-biphenyldicarboxylic acid and 4,4'-oxydibenzoic acid.

13. A parison according to claim 9, wherein the aromatic hydroxyacid is selected from the group consisting of p-hydroxybenzoic acid, salicylic acid and 6-hydroxy-2-naphthoic acid.

14. A parison according to claim 9, wherein the copolymer contains from 0.1 to 5 mol %, based on ethylene glycol, of 1,2-dioxyethylene units.

15. A parison according to claim 14 wherein the 1,2-dioxyethylene units are present in an amount between 0.1 to 3 mol %, based on ethylene glycol.

* * * * *

UNITED STATES PATENT AND TRADEMARK OFFICE
CERTIFICATE OF CORRECTION

PATENT NO. : 5,882,751
DATED : March 16, 1999
INVENTOR(S) : Ernesto OCCHIELLO et al.

It is certified that error appears in the above-identified patent and that said Letters Patent is hereby corrected as shown below:

On the title page, item [30], the Foreign Application Priority Data should read:

--May 27, 1994 [IT] Italy .................................................001087 MI94A--

Signed and Sealed this

Tenth Day of August, 1999

Q. TODD DICKINSON

*Attest:*

*Attesting Officer*  *Acting Commissioner of Patents and Trademarks*